United States Patent
Yamamoto (10) Patent No.: US 8,931,804 B2
(45) Date of Patent: Jan. 13, 2015

(54) STEERING DEVICE (75) Inventor: Kou Yamamoto, Maebashi (JP)

(73) Assignee: NSK Ltd., Tokyo (JP)

( * ) Notice: Subject to any disclaimer, the term of this patent is extended or adjusted under 35 U.S.C. 154(b) by 21 days.

(21) Appl. No.: 13/379,250

(22) PCT Filed: Jul. 27, 2011

(86) PCT No.: PCT/JP2011/067041
§ 371 (c)(1),
(2), (4) Date: Mar. 28, 2013

(87) PCT Pub. No.: WO2012/017880
PCT Pub. Date: Feb. 9, 2012

(65) Prior Publication Data
US 2013/0174685 A1    Jul. 11, 2013

(30) Foreign Application Priority Data

Aug. 4, 2010   (JP) .................. 2010-175040

(51) Int. Cl.
B62D 1/185    (2006.01)
B62D 1/187    (2006.01)
B62D 1/184    (2006.01)

(52) U.S. Cl.
CPC ............. B62D 1/185 (2013.01); B62D 1/187 (2013.01); B62D 1/184 (2013.01)
USPC ........................................... 280/775; 74/493

(58) Field of Classification Search
CPC .......... B62D 1/18; B62D 1/184; B62D 1/185; B62D 1/189; B62D 1/192; B62D 1/195
USPC ................... 280/775, 777, 779; 74/492, 493; 180/443
See application file for complete search history.

(56) References Cited

U.S. PATENT DOCUMENTS

| 3,791,223 | A | * | 2/1974 | Treichel et al. | ................ | 74/493 |
| 4,075,903 | A | * | 2/1978 | Cornell | ............................ | 74/493 |
| 6,467,807 | B2 | * | 10/2002 | Ikeda et al. | .................... | 280/775 |
| 6,659,504 | B2 | * | 12/2003 | Riefe et al. | ..................... | 280/777 |
| 7,441,807 | B2 | * | 10/2008 | Yoshimoto et al. | ........... | 280/777 |
| 8,549,953 | B2 | * | 10/2013 | Schnitzer | ........................ | 74/493 |

FOREIGN PATENT DOCUMENTS

| JP | 2008-030542 | * | 2/2008 |
| JP | 2008-030643 | * | 2/2008 |
| JP | 2008-132819 | * | 6/2008 |
| JP | 2008-213521 | * | 9/2008 |

* cited by examiner

Primary Examiner — Paul N Dickson
Assistant Examiner — George Spisich
(74) Attorney, Agent, or Firm — Crowell & Moring LLP (57) ABSTRACT In a steering device, when a telescopic position of a steering wheel is disposed at a vicinity of an adjustment end on a front side of a vehicle body, if a large force is applied erroneously to the steering wheel toward the front side of the vehicle body, rear ends of telescopic position adjusting long grooves are brought into contact with a fastening rod and push the fastening rod to the front side of the vehicle body. An engaging protrusion pushes an inner column to the front side of the vehicle body. A large force to the front side of the vehicle body, which is applied to the steering wheel is supported by the vehicle body via the inner column, and a force which is applied to a vehicle body attaching bracket can be reduced. This prevents the vehicle body attaching bracket from becoming detached from the vehicle body.

6 Claims, 9 Drawing Sheets

STEERING DEVICE

TECHNICAL FIELD

The present invention relates to a steering device, particularly relates to a steering device of a position adjusting type which can adjust a telescopic position (a position in a front and rear direction) of a steering wheel in accordance with a physical constitution of a driver and a driving attitude thereof.

BACKGROUND ART

As a device for adjusting a telescopic position of a steering wheel in accordance with the physical constitution of a driver and a driving attitude thereof, there is a steering device which is referred to as a telescopic type steering device. Further, as a device for adjusting positions of both of a tilt position (a position in an up and down direction) and a telescopic position of a steering wheel, there is a steering device which is referred to as a tilt telescopic type steering device.

According to the steering devices, there is provided a fastening rod which fastens an outer column that is adjusted to a desired adjusting position to an inner column by operating an operating lever, and fastens to clamp the outer column to a side plate of a vehicle body attaching bracket. Further, when a large impact force is operated to a front side of a vehicle body in second collision, the vehicle body attaching bracket is detached from the vehicle body and is collapsed to move to the front side of the vehicle body to thereby alleviate an impact force which is exerted to a driver.

According to the steering devices, there is a case where when the telescopic position of the steering wheel is disposed at a vicinity of an adjusting end on the front side of the vehicle body in a state of releasing the outer column from fastening the inner column, a large force is erroneously exerted to the steering wheel toward the front side of the vehicle body. Then, a rear end in view of the vehicle body of a long groove for adjusting the telescopic position of the outer column is brought into contact with the fastening rod and pushes the fastening rod to the front side of the vehicle body. When the fastening rod is pushed to the front side of the vehicle body, the fastening rod pushes the vehicle body attaching bracket to the front side of the vehicle body, the vehicle body attaching bracket is detached from the vehicle body, and there is a concern of detaching the outer column.

According to a steering device of Japanese Unexamined Patent application No. 2001-322552, when an outer column is fastened to an inner column, play of the inner column relative to the outer column is eliminated by pressing an outer peripheral face of the inner column by a play eliminating cam. However, when fastening of the outer column to the inner column is released in order to adjust a telescopic position of a steering wheel, the play eliminating cam is detached from the outer peripheral face of the inner column. Therefore, when a large force is exerted erroneously to the steering wheel toward a front side of a vehicle body, a large pressing force to the front side of the vehicle body is operated to a fastening rod and a vehicle body attaching bracket, and therefore, the vehicle body attaching bracket cannot be prevented from detaching from the vehicle body.

SUMMARY OF THE INVENTION

Problems to be Solved by the Invention

It is a problem of the present invention to provide a steering device of preventing a vehicle body attaching bracket from being detached from a vehicle body, even if a large force is exerted to a steering wheel toward a front side of the vehicle body when a telescopic position of the steering wheel is disposed at a vicinity of an adjustment end on the front side of the vehicle body.

Means for Solving the Problem

The problem described above can be solved by the following means. That is, a first aspect of the present invention is a steering device characterized in including an inner column which can be fixed to a vehicle body, an outer column which is outwardly fitted to an outer peripheral face of the inner column to be able to adjust a telescopic position, has a slit which is formed over a predetermined length in an axial direction, and axially supports pivotably a steering shaft which is mounted with a steering wheel, a vehicle body attaching bracket which can be attached to the vehicle body to be able to collapse and move to a front side of the vehicle body, a fastening rod which clamps the outer column to the vehicle body attaching bracket by fastening the vehicle body attaching bracket to an inner side in a vehicle width direction by operating an operating lever in order to clamp the outer peripheral face of the inner column and clamp the outer column to the vehicle body attaching bracket by contracting an inner peripheral face of the outer column in a diameter thereof at a desired telescopic position, a telescopic position adjusting long groove which is formed at the outer column, formed to prolong in a telescopic position adjusting direction, and inserted with the fastening rod, an engaging groove which is formed at the inner column, and an engaging member which is engaged with the engaging groove by rotating along with the fastening rod when the outer column is unclamped from the vehicle body attaching bracket by operating the operating lever.

A second aspect of the present invention is the steering device according to the first aspect of the present invention, characterized in that the engaging groove is formed at a phase the same as a phase of the slit.

A third aspect of the present invention is the steering device according to the first aspect of the present invention, characterized in that a front end in view of the vehicle body of the engaging groove and a front end in view of the vehicle body of the engaging member are brought into face contact with each other.

A fourth aspect of the present invention is the steering device according to the first aspect of the present invention, characterized in that a length in an axial direction of the engaging groove is formed by the shortest length by which when the engaging member is engaged with and detached from the engaging groove, the engaging member does not interfere with the engaging groove.

A fifth aspect of the present invention is the steering device according to the first aspect of the present invention, characterized in including an urging member which presses the engaging member to the engaging groove by urging the engaging member in an axial direction of the fastening rod.

A sixth aspect of the present invention is the steering device according to the first aspect of the present invention, characterized in that a steering assisting portion which exerts a predetermined steering assisting force to the steering shaft in accordance with a torque which is applied to the steering wheel is attached to the inner column.

Effect of the Invention

The steering device of the present invention includes the inner column which can be fixed to the vehicle body, the outer column which is outwardly fitted to the outer peripheral face of the inner column to be able to adjust the telescopic position, has the slit which is formed over the predetermined length in the axial direction, and axially supports pivotably the steering shaft which is mounted with the steering wheel, the vehicle body attaching bracket which can be attached to the vehicle body to be able to collapse and move to the front side of the vehicle body, the fastening rod which clamps the outer column to the vehicle body attaching bracket by fastening the vehicle body attaching bracket to the inner side in the vehicle width direction by operating the operating lever in order to clamp the outer peripheral face of the inner column and clamp the outer column to the vehicle body attaching bracket by contracting the inner peripheral face of the outer column in the diameter at the desired telescopic position, the telescopic position adjusting long groove which is formed at the outer column, formed to prolong in the telescopic position adjusting direction, and inserted with the fastening rod, the engaging groove which is formed at the inner column, and the engaging member which is engaged with the engaging groove by rotating along with the fastening rod when the outer column is unclamped from the vehicle body attaching bracket by operating the operating lever.

Therefore, when the telescopic position of the steering wheel is disposed at a vicinity of the adjustment end on the front side of the vehicle body, if a large force is erroneously exerted to the steering wheel toward the front side of the vehicle body, a rear end in view of the vehicle body of the telescopic position adjusting long groove of the outer column is brought into contact with the fastening rod, and pushes the fastening rod to the front side of the vehicle body. When the fastening rod is more or less pushed to the front side of the vehicle body, the engaging member is brought into contact with the engaging groove and pushes the inner column to the front side of the vehicle body. The inner column is fixed to the vehicle body, and therefore, the large force to the front side of the vehicle body which is exerted to the steering wheel is supported by the vehicle body via the inner column, and the force which is exerted to the vehicle body attaching bracket can be reduced. Therefore, the vehicle body attaching bracket can be prevented from being detached from the vehicle body. Further, when the engaging groove is formed at the phase the same as the phase of the slit, the engaging member can compactly be contained at the inner portion of the slit, and therefore, the configuration is preferable.

MODE FOR CARRYING OUT THE INVENTION

In the following embodiment, an explanation will be given of an example of applying the present invention to a steering device of a tilt telescopic type which adjusts positions of both of a position in an up and down direction and a position in a front and a rear direction of a steering wheel.

Figure 1:
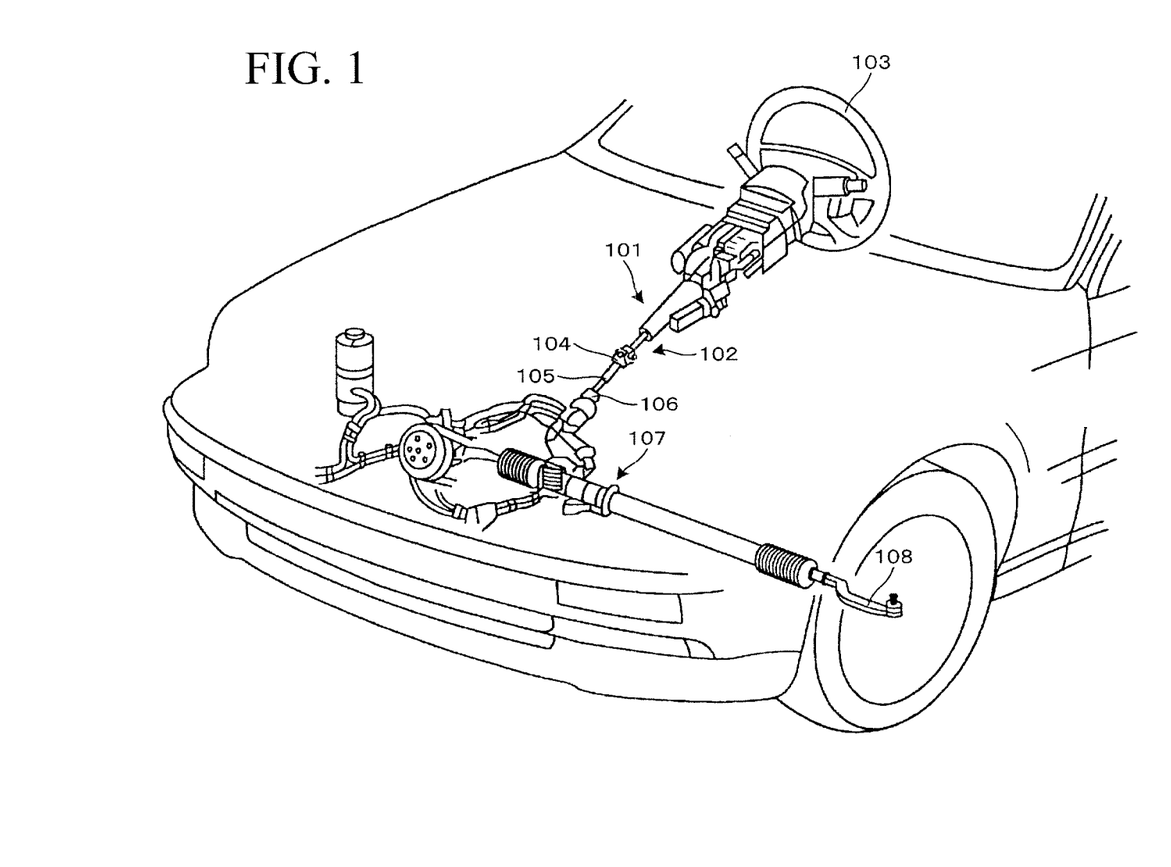
FIG. 1 is a total perspective view showing a state of mounting a steering device 101 according to the present invention to a vehicle.

FIG. 1 is a total perspective view showing a state of mounting a steering device 101 of the present invention to a vehicle. The steering device 101 axially supports a steering shaft 102 pivotably. The steering shaft 102 is mounted with a steering wheel 103 at an upper end thereof (on a rear side of a vehicle body), and a lower end (on a front side of the vehicle body) of the steering shaft 102 is connected with an intermediate shaft 105 via a universal joint 104.

The intermediate shaft 105 is connected with a universal joint 106 at a lower end thereof, and the universal joint 106 is connected with a steering gear 107 configured by a rack and pinion mechanism or the like.

When a driver operates to rotate the steering wheel 103, a turning force thereof is transmitted to the steering gear 107 via the steering shaft 102, the universal joint 104, the intermediate shaft 105, and the universal joint 106, a tie rod 108 is moved via the rack and pinion mechanism, and a steering angle of a wheel can be changed.

Figure 2:
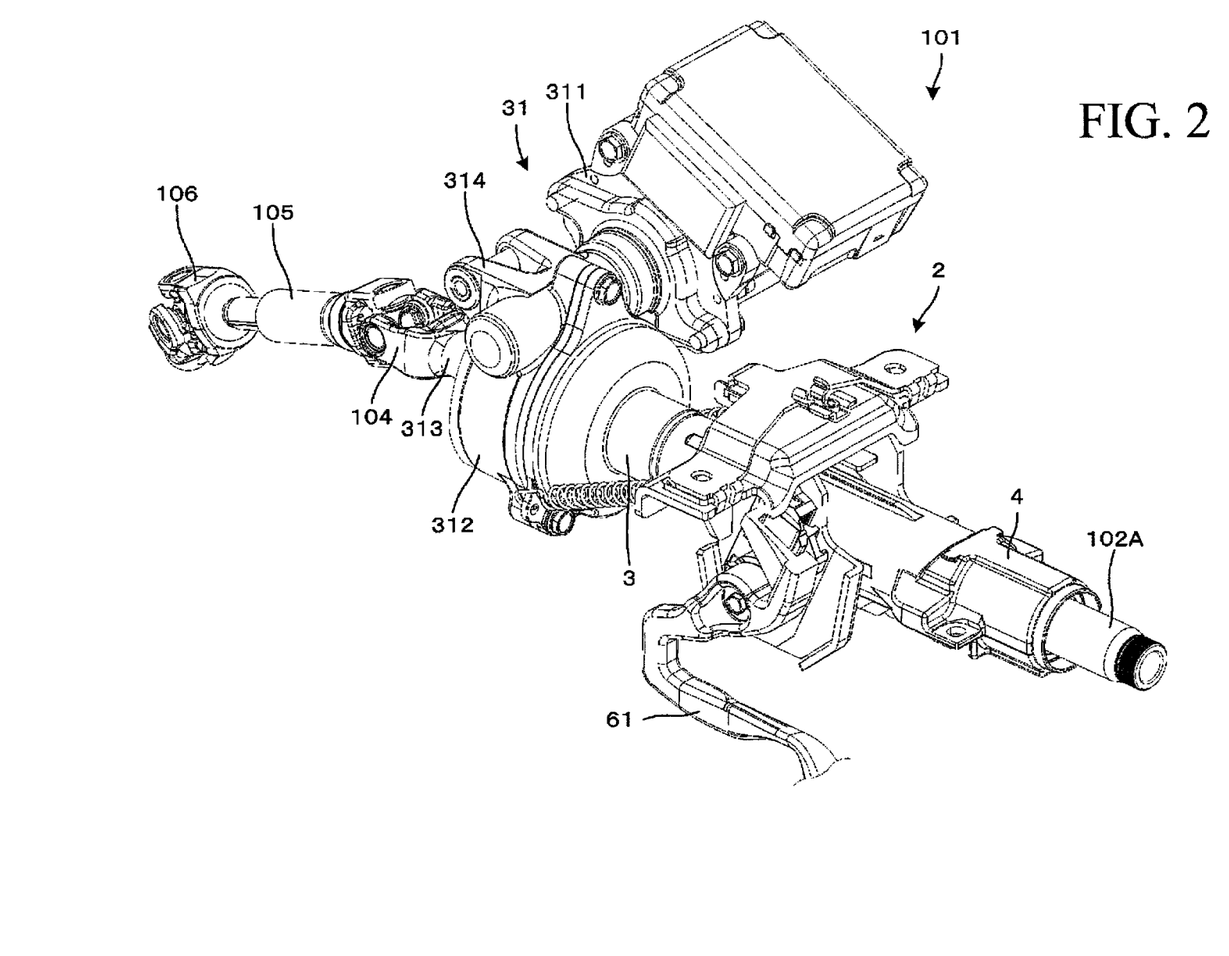
FIG. 2 is a perspective view of an essential portion viewing the steering device 101 of an embodiment of the present invention from a rear side of a vehicle body.
Figure 3:
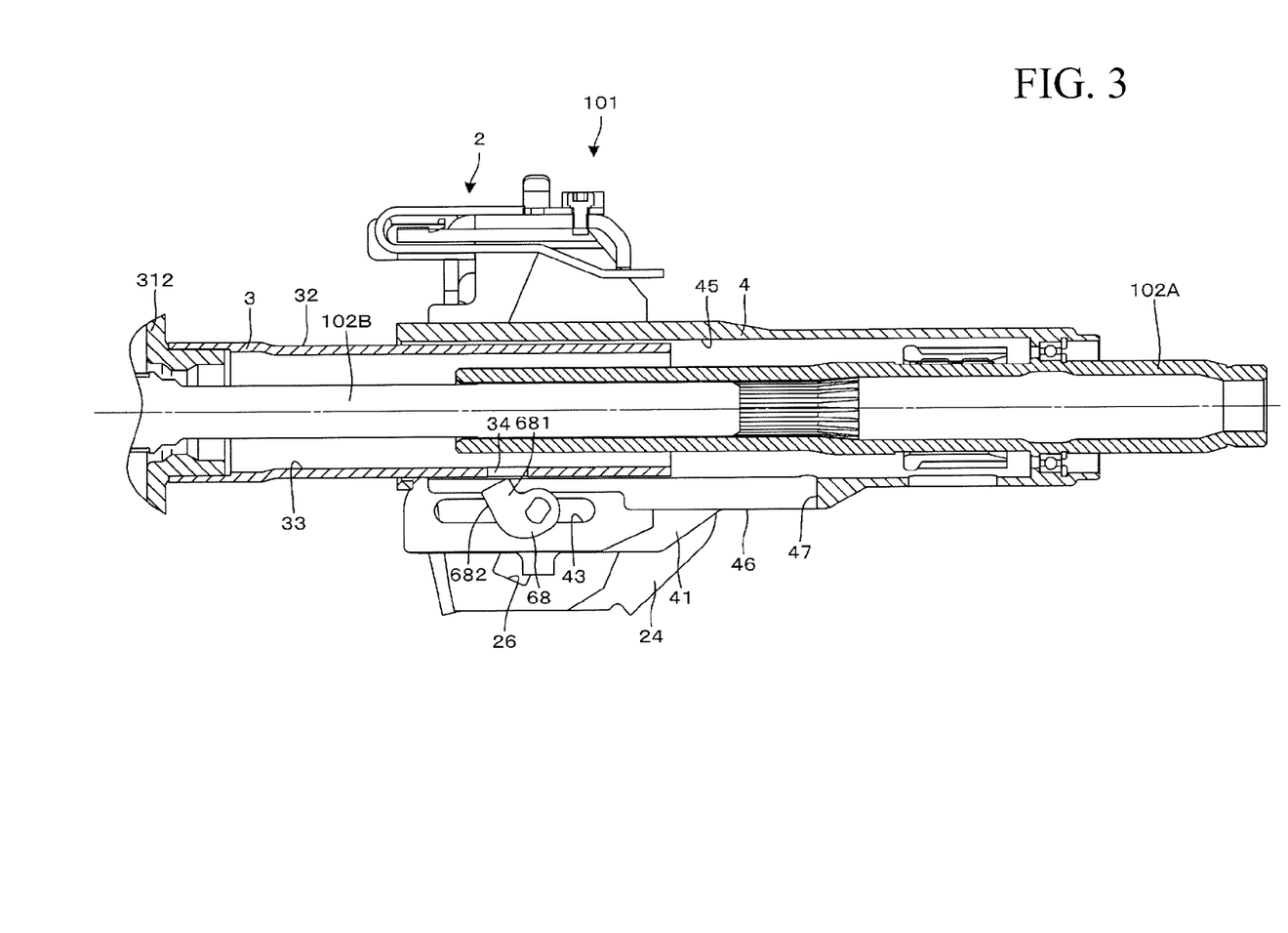
FIG. 3 is a vertical sectional view of a surrounding of a vehicle body attaching bracket of FIG. 2.
Figure 4:
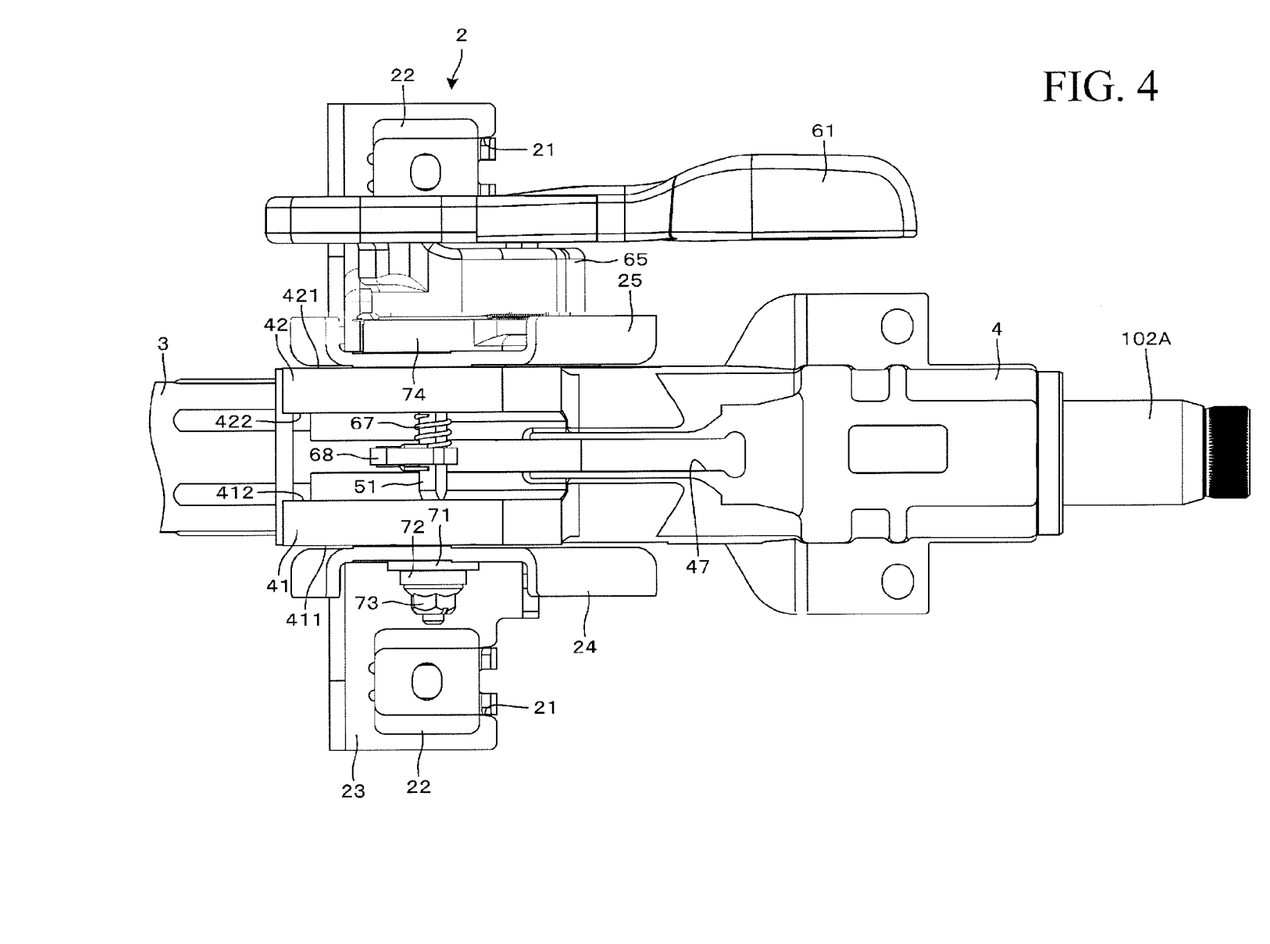
FIG. 4 is a bottom view of FIG. 3.
Figure 5:
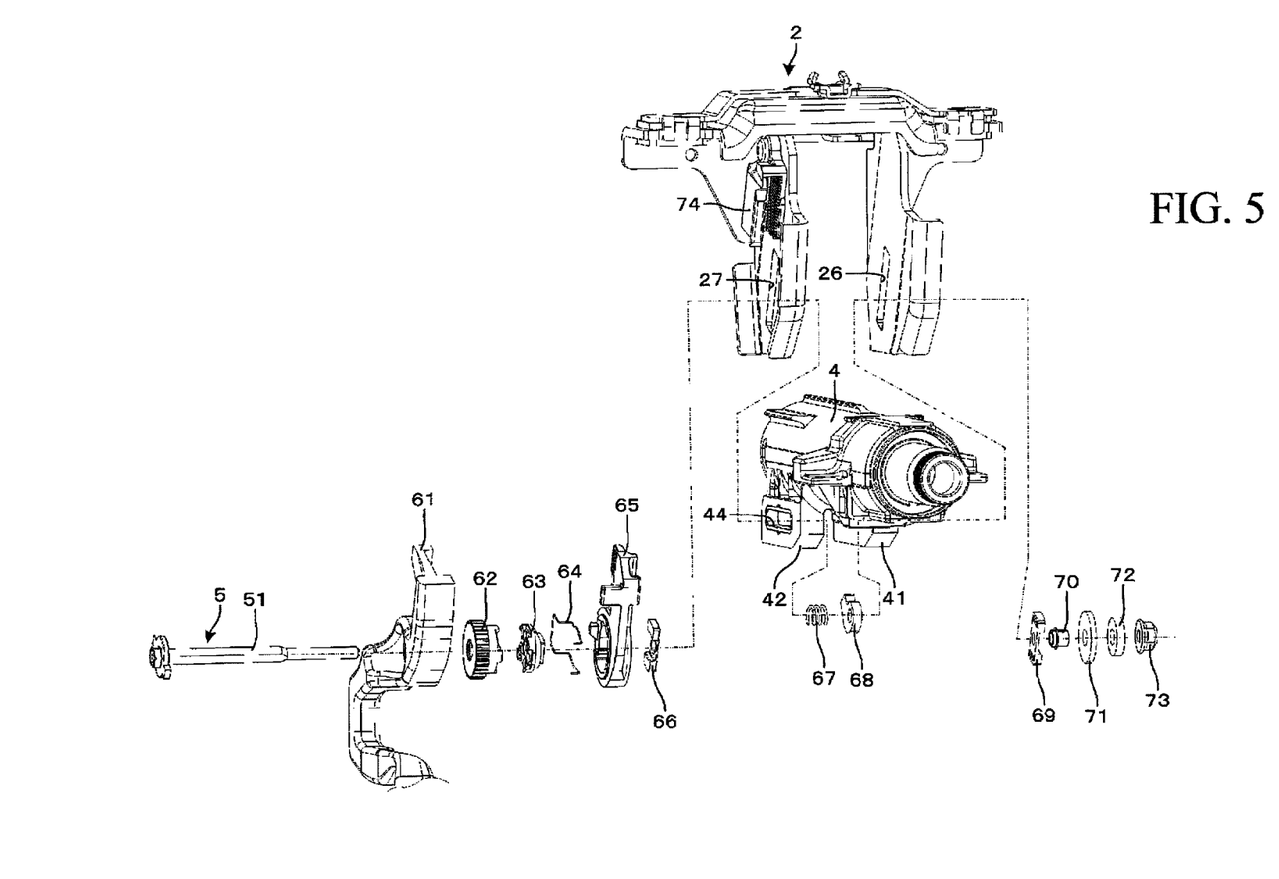
FIG. 5 is a disassembled perspective view viewing FIG. 3 from a rear side of a vehicle body.
Figure 6:
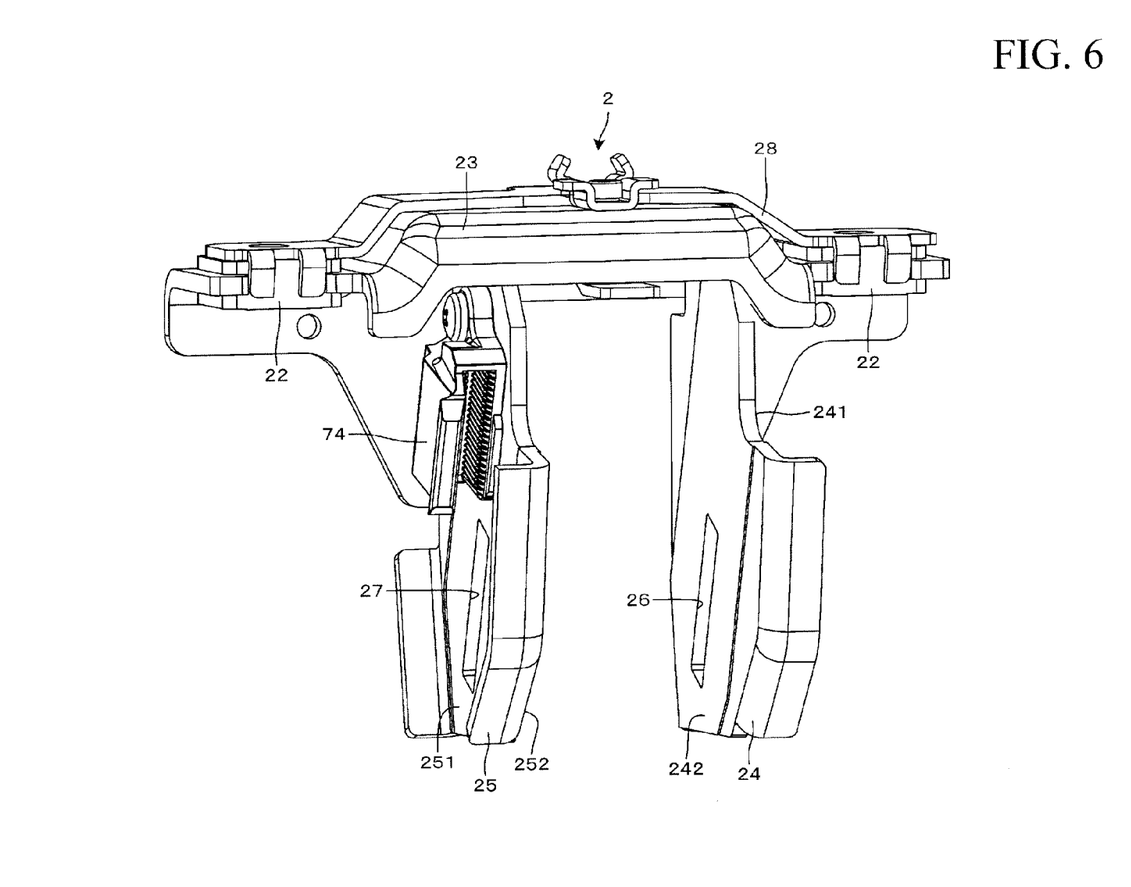
FIG. 6 is an enlarged perspective view of the vehicle body attaching bracket of FIG. 3.
Figure 7:
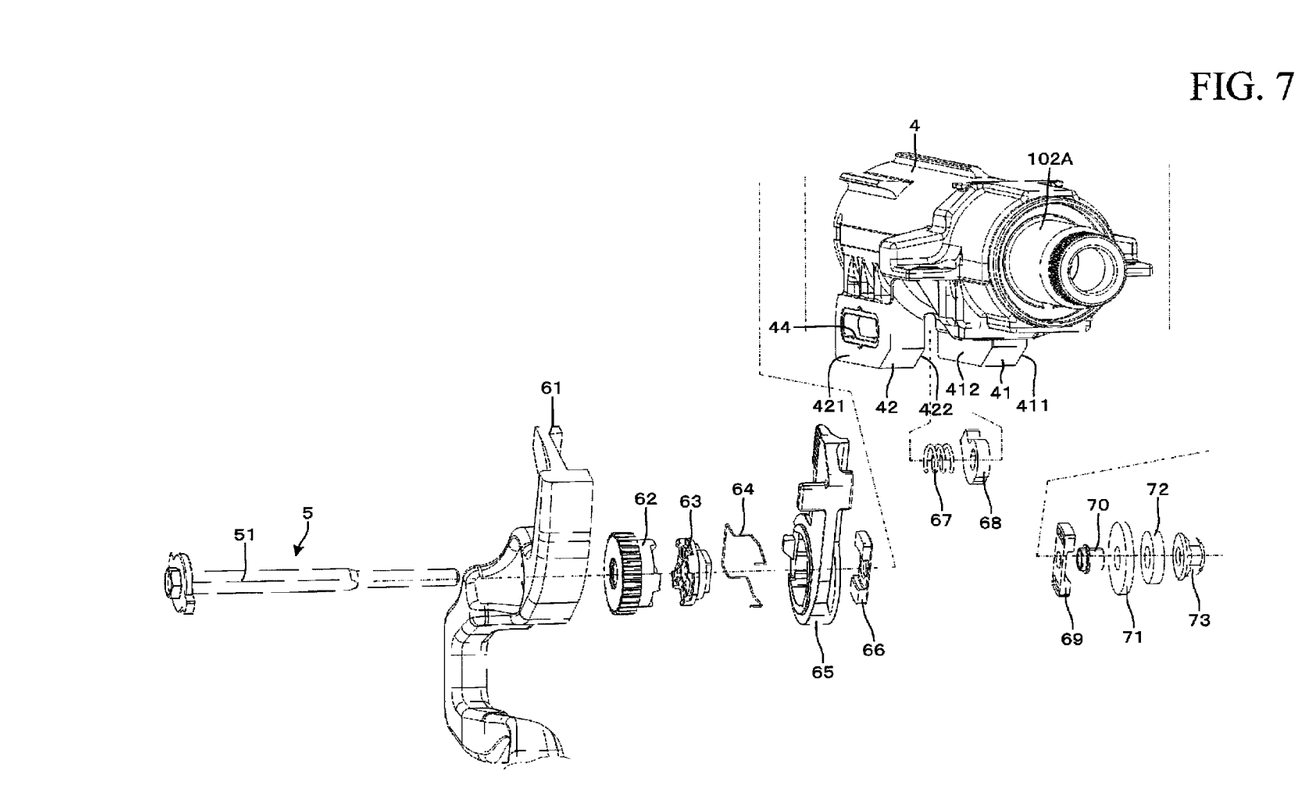
FIG. 7 is an enlarged disassembled perspective view of an outer column and a clamping device of FIG. 3.
Figure 8:
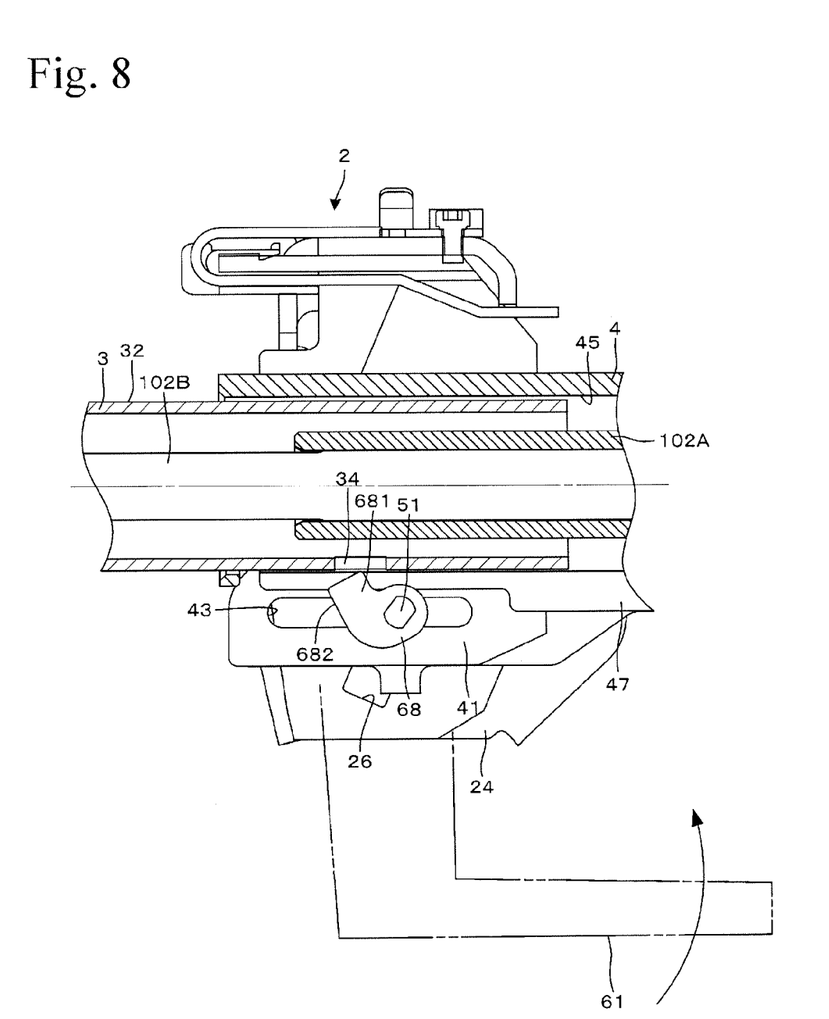
FIG. 8 is an enlarged vertical sectional view showing a state of clamping the outer column to the vehicle body attaching bracket by operating an operating lever.
Figure 9:
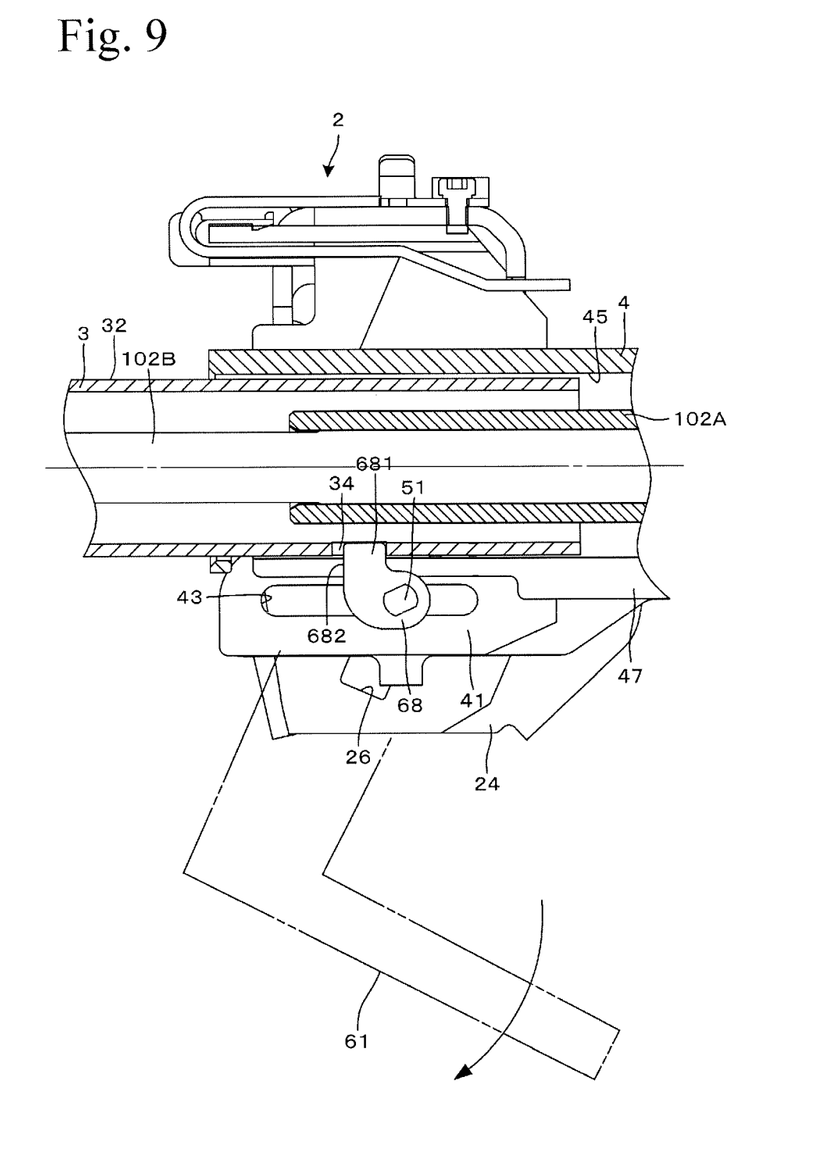
FIG. 9 is an enlarged vertical sectional view showing a state of unclamping the outer column from the vehicle body attaching bracket by operating the operating lever.

FIG. 2 is a perspective view of an essential portion viewing the steering device 101 of the embodiment of the present invention from a rear side of the vehicle body. FIG. 3 is a vertical sectional view of a surrounding of a vehicle body mounting bracket of FIG. 2, FIG. 4 is a bottom view of FIG. 3, and FIG. 5 is a disassembled perspective view viewing FIG. 3 from a rear side of the vehicle body. FIG. 6 is an enlarged perspective view of the vehicle body attaching bracket of FIG. 3, and FIG. 7 is an enlarged disassembled perspective view of an outer column and a clamping device of FIG. 3. FIG. 8 is an enlarged vertical sectional view showing a state of clamping the outer column to the vehicle body attaching bracket by operating an operating lever. FIG. 9 is an enlarged vertical sectional view showing a state of unclamping the outer column from the vehicle body attaching bracket by operating the operating lever.

As shown in FIG. 2, the steering device 101 of the embodiment of the present invention is configured by the vehicle body attaching bracket 2, an inner column (lower column) 3, a steering assisting portion 31 (electrically assisting mechanism), an outer column (upper column) 4 and the like.

A right end of the steering assisting portion (electric assisting mechanism) 31 is fixed to a front side of the vehicle body (left side of FIG. 2) of the inner column 3 by press fitting. The steering assisting portion 31 is configured by an electric motor 311, a reduction gearbox portion 312, an output shaft 313 and the like. In the steering assisting portion 31, a bracket 314 integrally formed with a front end in view of the vehicle body of the steering assisting portion 31 is supported by a vehicle body, not illustrated, to be able to adjust a tilt position via a tilt center axis, not illustrated.

As shown in FIG. 3, an inner peripheral face 45 of the outer column 4 is outwardly fitted to an outer peripheral face 32 of the inner column 3 to be able to adjust a telescopic position (slidably move in parallel with a center axis line of the inner column 3). An upper steering shaft 102A is axially supported pivotably by the outer column 4, and the steering wheel 103 (refer to FIG. 1) is fixed to an end portion on a rear side in view of the vehicle body (right side of FIG. 2) of the upper steering shaft 102A. A slit 47 penetrating from an outer peripheral face 46 to the inner peripheral face 45 of the outer column 4 is formed on a lower side in view of the vehicle body of the outer column 4. The slit 47 has a shape in which both of a front end side in view of the vehicle body and a rear end side in view of the vehicle body of the outer column 4 are closed.

A lower steering shaft 102B is axially supported pivotably by the inner column 3, and the lower steering shaft 102B is fitted to the upper steering shaft 102A by a spline. Therefore, rotation of the upper steering shaft 102A is transmitted to the lower steering shaft 102B regardless of a telescopic position of the outer column 4.

The steering assisting portion 31 detects a torque operated to the lower steering shaft 102B, and rotates the output shaft 313 by a necessary steering assisting force by driving the electric motor 311. Rotation of the output shaft 313 is transmitted to the steering gear 107 by way of the universal joint 104, the intermediate shaft 105, and the universal joint 106, and the steering angle of the wheel can be changed.

A front side in view of the vehicle body (left sides of FIG. 2, FIG. 3) of the outer column 4 is attached with the vehicle body attaching bracket 2 which sandwiches the outer column 4 from both left and right sides in a vehicle width direction. As shown in FIG. 3 through FIG. 6, the vehicle body attaching bracket 2 includes an upper plate 23 which is formed substantially horizontally in the vehicle width direction, and a pair of left and right side plates 24 and 25 which are extended to a lower side of the vehicle body from the upper plate 23 and sandwiches the outer column 4 from both left and right sides in the vehicle width direction.

The upper plate 23 is formed with notched grooves (which are formed by opening a rear side in view of the vehicle body of the upper plate 23) 21, 21 and the upper plate 23 is mounted to the vehicle body via capsules 22 and an impact absorbing plate (refer to FIG. 6) 28 fitted to the notched grooves 21 and 21.

According to the vehicle body attaching bracket 2 and the outer column 4, when a driver is impacted to the steering wheel 103 in second collision and a large impact force is operated thereto, the vehicle body attaching bracket 2 is detached from the capsules 22 to the front side of the vehicle body, and is collapsed to move to the front side of the vehicle body by being guided by the inner column 3, and the impact absorbing plate 28 is plastically deformed and absorbs an impact energy in collision.

The front side in view of the vehicle body of the outer column 4 is integrally formed with a pair of clamp members 41 and 42 by being protruded to a lower side in view of the vehicle body of the outer column 4. The clamp members 41 and 42 are formed with long grooves 43 and 44 for adjusting a telescopic position which are extended to prolong in an axis center direction of the outer column 4. Further, the side plates 24 and 25 of the vehicle body attaching bracket 2 are formed with tilt adjusting long grooves 26 and 27. The tilt adjusting long grooves 26 and 27 are formed in a circular arc shape centering on a tilt center axis. Outer side faces 411 and 421 of the clamp members 41 and 42 are slidably brought into contact with inner side faces 242 and 252 of the side plates 24 and 25 of the vehicle body attaching bracket 2.

As shown in FIG. 5 and FIG. 7, a fastening rod 5 in a shape of a round bar is inserted from left sides of FIG. 5 and FIG. 7 by passing the tilt adjusting long grooves 26 and 27 and the telescopic position adjusting long grooves 43 and 44. An operating lever 61, a movable cam 62, a fixed cam 63, a movable tilt lock gear 65, and a tilt spacer 66 are outwardly fitted to a left end side of the fastening rod 5 successively from a left side, and passes through the tilt adjusting long groove 27 and the telescopic position adjusting long groove 44.

Thereafter, a spring (coil spring) 67 and an engaging member 68 inserted between inner side faces 412 and 422 of the clamp members 41 and 42 are outwardly fitted to the fastening rod 5, and a right end of the fastening rod 5 is passed through the telescopic position adjusting long groove 43 and the tilt adjusting long groove 26. Successively, a tilt spacer 69, a cylindrical spacer 70, a washer 71, and a thrust bearing 72 are outwardly fitted to a right end side of the fastening rod 5 successively from a left side, and a calking nut 73 is calked to be fixed to the right end of the fastening rod 5.

As shown in FIG. 3, a lower side in view of the vehicle body of the inner column 3 is formed with an engaging groove 34 penetrating from the outer peripheral face 32 to an inner peripheral face 33 of the inner column 3. The engaging groove 34 is formed at a phase position the same as a phase position of the slit 47 of the outer column 4. As shown in FIG. 3, in a state of clamping the outer column 4 to the vehicle body attaching bracket 2, the engaging member 68 is rotated in the counterclockwise direction along with the fastening rod 5, and an engaging protrusion 681 of the engaging member 68 is detached from the engaging groove 34. The engaging groove 34 is formed at the phase position the same as the phase position of the slit 47, and therefore, the engaging member 68 can compactly be contained to an inner portion of the slit 47.

A length in an axial direction of the engaging groove 34 is formed by the shortest length to a degree by which when the engaging protrusion 681 of the engaging member 68 is engaged with and detached from the engaging groove 34, the engaging protrusion 681 does not interfere with a front end in view of the vehicle body and a rear end in view of the vehicle body of the engaging groove 34. Therefore, when the inner peripheral face 45 of the outer column 4 is contracted in a diameter thereof to fasten to clamp (telescopically clamp) the outer peripheral face 32 of the inner column 3, an amount of crushing the inner column 3 is restrained to be small, and a reduction in a telescopic clamping force can be restrained.

The fixed cam 63 is made to stop rotating by fitting a rectangular portion formed at a right end face of the fixed cam 63 to the tilt adjusting long groove 27. A left side of the fastening rod 5 is formed with a rectangular outer peripheral face 51 over a predetermined length in the axial direction. The rectangular outer peripheral face 51 of the fastening rod 5 is inwardly fitted to rectangular holes formed at the operating lever 61 and the engaging member 68 to be able to transmit a rotating torque. The movable cam 62 is press-fit to the operating lever 61, and pivotably moved integrally with the operating lever 61.

Plural gears are formed at the movable tilt lock gear 65 in a tilting direction, and are brought in mesh with plural gears of a fixed tilt lock gear 74 fastened to an outer peripheral face 251 of the side plate 25 by a bolt to make a holding force in the tilting direction strong. A spring 64 is inserted between a right end face of the fixed cam 63 and a left end face of the movable tilt lock gear 65, and when the outer column 4 is unclamped from the vehicle body attaching bracket 2, play of the operating lever 61 is reduced, and the movable tilt lock gear 65 is made to float relative to the fixed cam 63 such that the movable tilt lock gear 65 and the fixed tilt lock gear 74 are smoothly brought in mesh with each other.

The tilt spacers 66 and 69 are made of a synthetic resin, and have substantially rectangular shapes prolonged in the tilting direction, and formed by a width between two faces of a dimension substantially the same as groove lengths of the tilt adjusting long grooves 26 and 27. Therefore, the tilt spacers 66 and 69 are inwardly fitted to the tilt adjusting long grooves 26 and 27 and slidably moved smoothly in the tilt adjusting direction when the tilting position of the outer column 4 is adjusted.

FIG. 3 and FIG. 8 are vertical sectional views showing a state of clamping the outer column 4 to the vehicle body attaching bracket 2 by operating to pivot the operating lever 61 in the counterclockwise direction. When the operating lever 61 is pivotably moved in a clamping direction, a ridge of an inclined cam face of the movable cam 62 is mounted on a ridge of an inclined cam face of the fixed cam 63, an inner side end face in the vehicle width direction of the fixed cam 63 pushes the outer side face 251 of the side plate 25 on the left side to an inner side, the side plate 25 on the left side is elastically deformed to the inner side, and the outer side face 421 of the clamp member 42 on the left side of the outer column 4 is strongly pressed.

When the ridge of the inclined cam face of the movable cam 62 is mounted on the ridge of the inclined cam face of the fixed cam 63, the fastening rod 5 is pulled to the left sides of FIG. 5 and FIG. 7, the washer 71 pushes an outer side face 241 of the side plate 24 on the right side to the inner side, the side plate 24 on the right side is elastically deformed to the inner side, and the outer side face 411 of the clamp member 41 on the right side of the outer column 4 is strongly pressed.

In this way, the left and right clamp members 41 and 42 of the outer column 4 can be tilted to clamp to the vehicle attaching bracket 2 by fastening the vehicle attaching bracket 2 by a large holding force at a predetermined tilting adjusting position. Further, the clamp members 41 and 42 are elastically deformed to the inner side in a direction of making the inner side faces 412 and 422 of the clamp members 41 and 42 proximate to each other, and a width of the slit 47 of the outer column 4 is narrowed. Therefore, the inner peripheral face 45 of the outer column 4 is contracted in the diameter, and fastens to clamp (telescopically clamp) the outer peripheral face 32 of the inner column 3. As shown in FIG. 8, in a state of tilting and clamping and telescopically clamping, the engaging protrusion 681 of the engaging member 68 is detached from the engaging groove 34.

FIG. 9 is an enlarged vertical sectional view showing a state of unclamping the outer column 4 from the vehicle body attaching bracket 2 by operating the operating lever 61. When a driver operates to pivot the operating lever 61 in the clockwise direction, a ridge of the inclined cam face of the fixed cam 63 and a valley of the inclined cam face of the movable cam 62 are brought in mesh with each other. Then, positions in axial directions of the fixed cam 63 and the movable cam 62 are relatively proximate to each other. The side plates 24 and 25 of the vehicle body attaching bracket 2 in which an interval between the side plates 24 and 25 in a free state is set more widely than a width between the outer side faces 411 and 421 of the left and right clamp members 41 and 42 of the outer column 4 are respectively elastically recovered in a direction opposed to the sandwiching direction.

Thereby, the outer column 4 is brought into a state of being free from the side plates 24 and 25 of the vehicle body attaching bracket 2. Further, the clamp members 41 and 42 are elastically recovered to outer sides in a direction of separating the inner side faces 412 and 422 of the clamp members 41 and 42 from each other, and a width of the slit 47 of the outer column 4 is widened. Therefore, the inner peripheral face 45 of the outer column 4 is widened in a diameter thereof, and loosens to unclamp (telescopically unclamp) the outer peripheral face 32 of the inner column 3. As shown in FIG. 9, in a state of being tiltingly unclamped and telescopically unclamped, the engaging member 68 is rotated in the clockwise direction along with the fastening rod 5, and the engaging protrusion 681 of the engaging member 68 is engaged with the engaging groove 34. As shown in FIG. 9, a contact face 682 on the front side in view of the vehicle body of the engaging protrusion 681 is brought into a state of being substantially in parallel with the front end in view of the vehicle body of the engaging groove 34.

In a state of being tiltingly unclamped and telescopically unclamped, more or less play is produced in the rotating direction of the fastening rod 5. At this occasion, the spring (urging member) 67 inserted between the inner side face 422 of the clamp member 42 and the engaging member 68 urges the engaging member 68 in an axial direction of the fastening rod 5 to press a side face in a vehicle width direction of the engaging member 68 to the engaging groove 34 and prevents the engaging member 68 from being shifted from an engaging position of the engaging groove 34 by rotating the engaging member 68.

Under the state, the adjustment of the steering wheel 103 in a tilting direction can arbitrarily be carried out by displacing the outer column 4 in the tilting direction while guiding the fastening rod 5 by the tilt adjusting long grooves 26 and 27 of the vehicle body attaching bracket 2. Further, the adjustment of the steering wheel 103 in the telescopic direction can arbitrarily be carried out by displacing the outer column 4 in the telescopically moving direction along the outer peripheral face 32 of the inner column 3 while guiding the telescopically adjusting long grooves 43 and 44 of the outer column 4 by the fastening rod 5.

Assume a case in which when the telescopically moving position of the steering wheel 103 is disposed at a vicinity of an adjustment end on the front side of the vehicle body, a large force is exerted erroneously to the steering wheel 103 toward the front side of the vehicle body. Then, rear ends in view of the vehicle body of the telescopically adjusting long grooves 43 and 44 of the outer column 4 are brought into contact with the fastening rod 5, and push the fastening rod 5 to the front side of the vehicle body. When the fastening rod 5 is more or less pushed to the front side of the vehicle body, the contact face 682 on the front side of the vehicle body of the engaging protrusion 681 is brought into face contact with the front end in view of the vehicle body of the engaging groove 34, and pushes the inner column 3 to the front side of the vehicle body.

The front side in view of the vehicle body of the inner column 3 is fixed to the vehicle body by the bracket 314. Therefore, a large force to the front side of the vehicle body exerted to the steering wheel 103 is supported by the vehicle body via the inner column 3, and a force exerted to the vehicle body attaching bracket 2 can be reduced. Therefore, the vehicle body attaching bracket 2 can be prevented from detaching from the vehicle body. When protrusions are formed at the front end in view of the vehicle body of the engaging groove 34 or a peripheral edge thereof to thereby increase an area of the engaging groove 34 brought into contact with the contact face 682 of the engaging protrusion 681, or the peripheral edge of the engaging groove 34 is reinforced by a rib, the durability and the rigidity of the engaging groove 34 are increased, and therefore, the configuration is preferable.

Although according to the embodiment described above, the explanation has been given of the case in which the present invention is applied to the tilt telescopic type steering device which can carry out both of the tilting position adjustment and the telescopically moving position adjustment, the present invention may be applied to a telescopic type steering device which can carry out only the telescopically moving position adjustment.

DESCRIPTION OF THE REFERENCE NUMERALS AND SIGNS 101 steering device
102 steering shaft
102A upper steering shaft
102B lower steering shaft
103 steering wheel
104 universal joint
105 intermediate shaft
106 universal joint
107 steering gear
108 tie rod
2 vehicle body attaching bracket
21 notched groove
22 capsule
23 upper plate
24 side plate
241 outer side face
242 inner side face
25 side plate
251 outer side face
252 inner side face
26, 27 tilt adjusting long grooves
28 impact absorbing plate
3 inner column
31 steering assisting portion
311 electric motor
312 reduction gearbox portion
313 output shaft
314 bracket
32 outer peripheral face
33 inner peripheral face
34 engaging groove
4 outer column
41, 42 clamp members
411, 421 outer side faces
412, 422 inner side faces
43, 44 telescopic movement adjusting long grooves
45 inner peripheral face
46 outer peripheral face
47 slit
5 fastening rod
51 rectangular outer peripheral face
61 operating lever
62 movable cam
63 fixed cam
64 spring
65 movable tilt lock gear
66 tilt spacer
67 spring
68 engaging member
681 engaging protrusion
682 contact face
69 tilt spacer
70 cylindrical spacer
71 washer
72 thrust bearing
73 calking nut
74 fixed tilt lock gear

The invention claimed is:

1. A steering device, comprising:
   an inner column which can be fixed to a vehicle body;
   an outer column which is fitted to an outer peripheral face of the inner column to be able to adjust a telescopic position, has a slit formed over a predetermined length in an axial direction, and axially supports rotatably a steering shaft which is mounted with a steering wheel;
   a vehicle body attaching bracket which can be attached to a vehicle body to be able to collapse and move to a front side of the vehicle body;
   a fastening rod with an operating lever which clamps the vehicle body attaching bracket to an outer surface of the outer column and an inner surface of the outer column to an outer surface of the inner column by operation of the operating lever at a selected axial position of the outer column;
   a telescopic position adjusting long groove which is formed at the outer column, the long groove extending in a telescopic position adjusting direction, the fastening rod being inserted into the long groove;
   an engaging groove which is formed at the inner column; and
   an engaging member which engages with the engaging groove by rotating along with the fastening rod when the outer column is unclamped from the vehicle body attaching bracket by operation of the operating lever.

2. The steering device according to claim 1, wherein the engaging groove is formed in-line with the slit.

3. The steering device according to claim 1, wherein a front end, relative to the vehicle body, of the engaging groove and a front end of the engaging member are brought into face contact with each other.

4. The steering device according to claim 1, wherein the engaging groove has a minimum size with which the engaging member is engageable with the engaging groove without interference.

5. The steering device according to claim 1, further comprising:
   an urging member which presses the engaging member to the engaging groove by urging the engaging member in an axial direction of the fastening rod.

6. The steering device according to claim 1, wherein a steering assisting portion which exerts a predetermined steering assisting force to the steering shaft in accordance with a torque which is applied to the steering wheel is attached to the inner column.

* * * * *